2,949,190

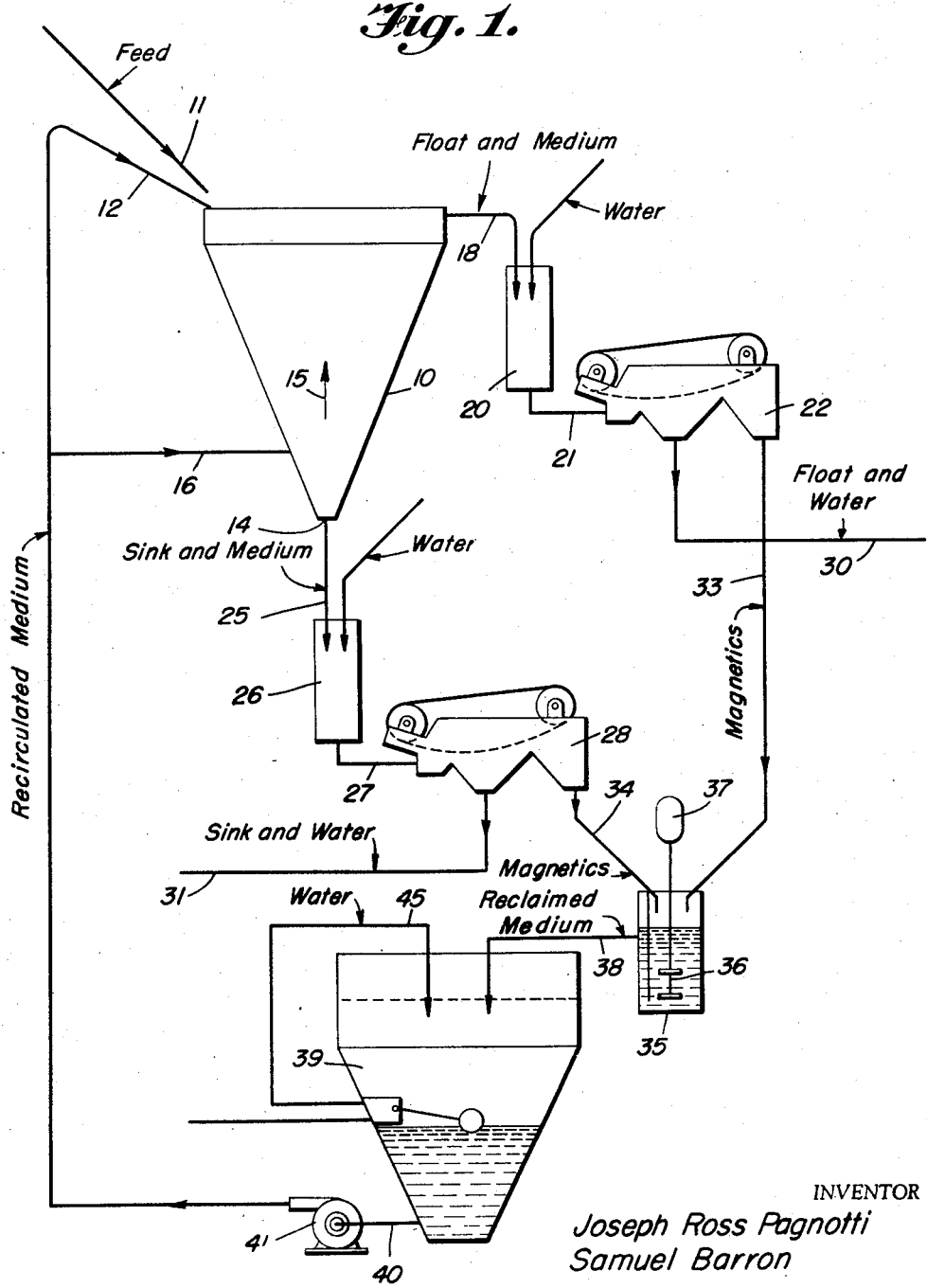

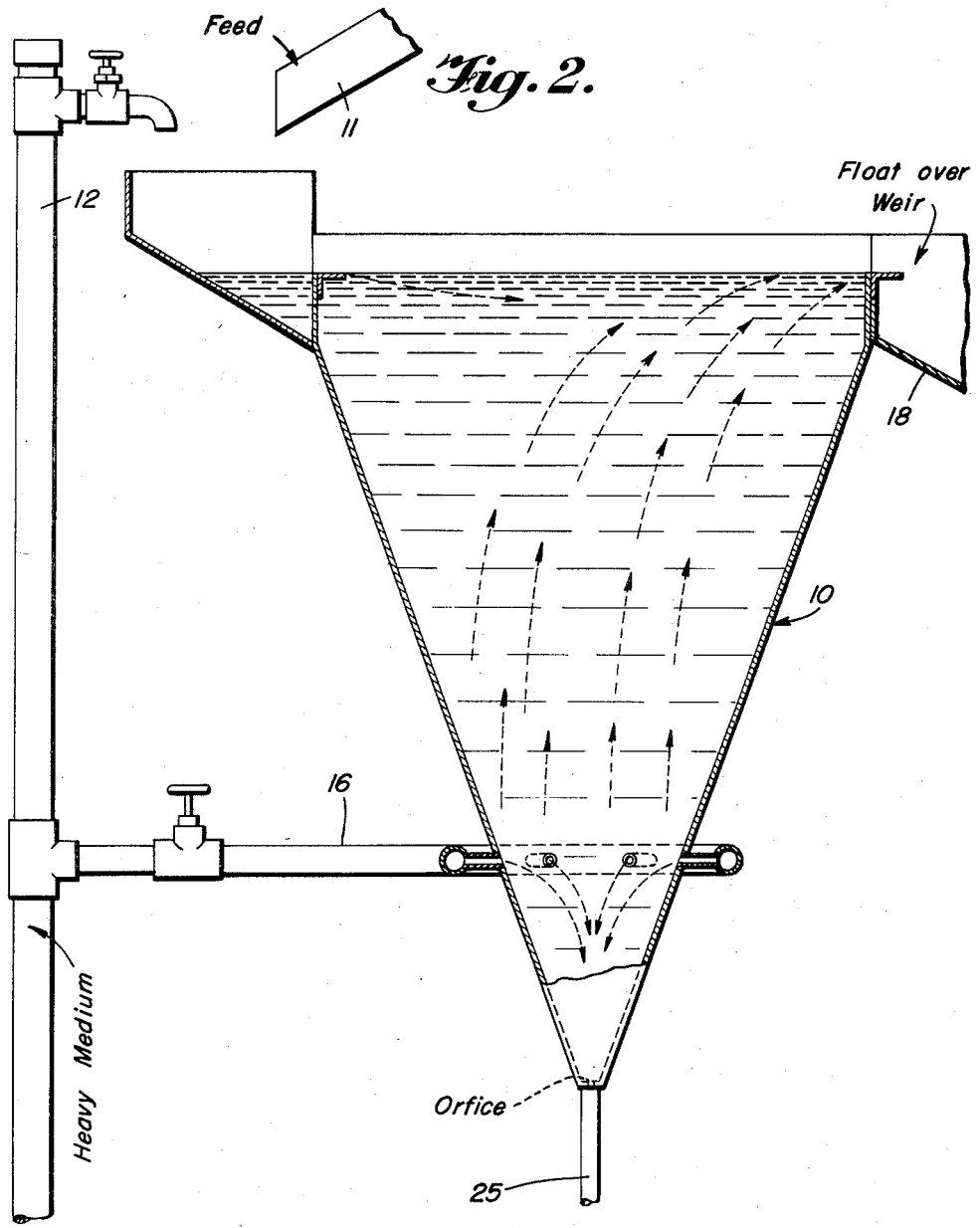

SEPARATION OF FINE SIZED SOLIDS

Joseph Ross Pagnotti, Old Forge, Pa., and Samuel Barron, West Long Branch, N.J., assignors to Mineral Processing Corporation, Dover, Del., a corporation of Delaware Filed Sept. 19, 1957, Ser. No. 685,000

5 Claims. (Cl. 209—172.5)

This invention relates a novel method for separating or cleaning fine sized solids having different specific gravities. More specifically, this invention relates to a continuously operating process whereby an efficient separation of particles of different specific gravities and of a size range of ¼" x 0 and preferably 10 mesh x 0 can be brought about by a unique use of a gravity or heavy medium.

Present gravity medium processes have proven advantageous for the separation of solids of different specific gravities only for sizes larger than ¼ inch. In all of these processes, a mixture of particles of different specific gravities is immersed in a gravity or heavy medium, having a specific gravity greater than the lighter particles and less than the heavier particles. The mixture is thereby separated into its component parts by the tendency of the heavier particles to sink and the lighter particles to float.

A conventional heavy medium is prepared by suspending comminuted solids of high specific gravity in water, to produce a suspension which is self-sustaining with moderate agitation. By properly proportioning the water and solids, a heavy medium of any desired specific gravity can be obtained.

Because of the cost of the medium solids, it is necessary that they be recovered from the sink and float products, recleaned, and reused, if the operation is to be considered practicable.

In present methods, the basis for the recovery of the medium solids is size. This makes the separation a relatively easy task, since the feed solids are coarser than .065 inch in diameter and the medium solids are finer than .003 inch in diameter. Nearly all of the gravity medium solids are recovered from the float and sink products by processing through drainage screens and can be reused without further processing. The small percentage of the medium solids adhering to the products after drainage is removed with spray water on washing screens. Medium solids so reclaimed by wash water must be further processed, since the desired water-solids ratio has been so drastically altered by dilution. The desired ratio is generally restored in a two step treatment, the first being by froth flotation, thickening, and filtration; or, if the medium is magnetically permeable, by magnetic attraction, and the second step being effected with a densifier. The magnetic technique is most commonly used, in conjunction with a thickener and densifier.

Although present gravity media processes are well adapted for the separation of sizes larger than ¼ inch, the practice of these processes cannot be adapted to the treatment of finer sizes. One of the difficulties is processing finer particles is the recovery of the media solids from the float and sink products. This difficulty becomes insurmountable as the size of these products approach the size of the media solids due to the inability to separate by screening. Attempts to recover the media from fine sized products by using drainage and washing screens have resulted in contamination of the medium with the separated products and also very high loss of media solids due to contamination of the finished products. This loss of media results in such a high replacement cost that the process becomes economically unfeasible.

The most serious problem encountered in the separation of fine sized solids into light and heavy fractions arises from the fact that fine solids separate much more slowly than do large particles. Fine solids that enter the medium as feed increase the viscosity and specific gravity of the medium bath, thereby further decreasing the settling rates of the particles. Because the settling velocities of these particles are so slow, eddy currents and other disturbances, introduced into the bath by the agitation normally required to maintain the suspension of the gravity media, completely and effectively prevent the separation of the fine sized solids.

Quite obviously, there then exists a strong need for an efficient and economic process, the practice of which will produce a separation of fine sized particles of different specific gravities.

It is the purpose of this invention to provide a novel and effective process that will satisfy this need for a way to separate fine sized solids of different specific gravities but avoids the various difficulties and limitations encountered in other processes.

By the present invention such a process is furnished. A novel method is here disclosed which functions to increase the separating rate of the fine solids, by using a heavy medium of specific gravity somewhat lower than the desired specific gravity of separation, and by imparting a sufficient upward movement to the medium to effect a separation at the desired gravity. The upward movement also assists in maintaining constant the density variation or gradient of the bath, and assists in removing the lighter particles and some heavy medium from the separating vessel. The heavier particles are removed from the separating vessel hydraulically by fluid which is introduced at a point removed from the separating zone.

The present invention preferably makes use of magnetically susceptible particles for the solid constituent of the heavy medium and utilizes this property to recover the media solids from the materials separated. The process further provides a treatment for the entire light fraction, without benefit of screens, in magnetic separators to recover the magnetically susceptible particles. A similar treatment is provided for the heavy fraction.

The objects of this invention are:

(1) To provide an efficient and economic process for the separation of fine particles of different specific gravities but particularly of a size range 10 mesh x 0, using a liquid suspension of heavy media without a step to eliminate the extreme fines, or steps which includes classification, either mechanical or hydraulic.

(2) To provide an apparatus in which the separation can be made under controlled conditions of specific gravity.

(3) To provide a method for reclaiming the media solids of magnetic permeability from the fine sink and float fractions for reintroduction into the system and to provide for the automatic control of the specific gravity of the medium.

(4) To provide a method for destroying the coalescence of the media solids in a liquid suspension and to restore the dispersed state of the medium.

Further objects include a novel mode of treating the heavy medium to destroy any coalescing that may have occurred to the media solids, the step of returning the medium to the separating vessel at the desired specific gravity, and the ease of separating the heavy media from the products.

Other and further objects of the invention will become more readily apparent from the following detailed description when taken in conjunction with the appended drawings in which:

Figure 1 is a schematic flow diagram of the system of the present invention; and Figure 2 is a schematic representation of the settling equipment showing in more detail the novel features of this step of the process.

Before referring to the drawings and setting forth a detailed description, the invention will first be put down in general terms. By these means, a better and clearer understanding should result.

The novel continuous process for the separation of fine solids of different specific gravities of a size range 10 mesh x 0, as taught by this invention, comprises the following steps in combination.

A mixture of fine particles, and heavy medium having a specific gravity less than the intended specific gravity of separation is introduced into a cone at or slightly below the surface of a fluid mass of finely divided solids of magnetic permeability carried in aqueous suspension. The fluid mass or bath is maintained in a substantially quiescent state and is characterized by a gravity variation increasing from top to bottom, which is maintained constant. Medium is also introduced into the cone at a point removed from the separation zone and adjacent to a discharge point at the apex, to impart an upward movement of the medium from that point, and to transport hydraulically the sink particles through a free discharge orifice. The lighter fraction and medium are removed by overflowing a weir at the top of the cone. The heavier fraction and medium are removed through the free discharge at the bottom of the cone. The entire overflow float fraction, which includes all the medium and float product, is passed directly to a magnetic separation in a continuous magnetic separator with or without addition of water. Likewise, the entire sink fraction, which includes all the medium and sink product, is passed directly to a magnetic separation in a separate magnetic separator with or without addition of water. The light and heavy products are discharged from the magnetic separators with water, but entirely free of magnetically permeable solids (media). The magnetically permeable solids (media) are discharged from the magnetic separators as a medium of specific gravity greater than the specific gravity of the circulating medium. The medium discharged from the magnetic separators is subjected to a violent agitation to destroy coalescence and to restore the state of dispersion. The dispersed medium is returned to a vessel where water is added by means of a float controlled valve operable to maintain a predetermined level and hence maintain the quantity of medium in the circuit constant. The medium is returned to the separating vessel at a constant specific gravity for recirculation through the system.

It will be noted that the system is closed with respect to the media and is essentially closed with respect to the medium. The quantity of water lost in the magnetic separators is such that the medium discharged is always of a higher specific gravity than that of the circulating medium. Therefore it is always necessary to add some water to maintain the volume of medium in the circuit constant. This is done automatically by means of the float controlled valve which admits water to hold a predetermined level. Since the quantity of media in the system is constant and the volume of medium in circulation is constant, the specific gravity of the circulating medium is maintained constant.

Referring now to the accompanying drawing, the invention will be described in terms of a preferred embodiment. For ease of description, the operation of the process will be explained as applied to the separation of fine sized anthraciate coal, having a specific gravity less than 1.70, from a refuse having a somewhat higher specific gravity. The magnetically permeable solids of the medium will be regarded as magnetite having a specific gravity of 5.0 and a size range of less than 325 mesh. Despite the specific references to particular materials, it is not the intent to limit the invention to the separation of coal from its refuse, nor to the use of magnetite. The selection of these materials is strictly by way of illustration and not for the purpose of restriction or limitation.

A feed comprising a mixture of particles 3/64" x 0 of anthraciate coal and refuse, for example, is introduced via chute 11 with a heavy medium via conduit 12 at or adjacent to the top of a cone-shaped separating vessel 10. The heavy medium is prepared with a liquid (water) to solids (magnetite) ratio to have a specific gravity less than the desired specific gravity of separation. Consequently, the medium is characterized by a specific gravity that is actually less than the specific gravity of either the coal or the refuse. Consequently, the buoyant forces of the medium are not great enough to float the coal or lighter particles. Therefore an additional force of sufficient magnitude and direction is generated in the settling tank 10 which combined with the buoyant forces of the medium will be sufficient to float the coal particles but insufficient to float the heavier refuse particles. This additional force is manifested as a pronounced upward current in the body of gravity medium as indicated on the drawing by the numeral 15 which shows the general location and direction of the induced upward current in the settling tank. It will be appreciated that the fluid in the tank is in a substantially quiescent state.

The coal particles and some medium are discharged from the cone separator over a weir in the usual manner. A special technique, however, is used to remove the refuse particles from the separating vessel. The refuse flows through a relatively small orifice 14 with medium injected into the cone via conduit 16 at a point below the separating zone. The quantity of medium introduced is at least equal to the quantity of fluid withdrawn from the opening 14 such that no downward movement of the medium takes place in the separating zone of the vessel. In some cases, a small excess can be injected to augment the induced upward current that flows through the separating zone.

The entire float fraction, comprising coal, magnetite, and water, is passed via conduit 18 directly to a dilution box 20 to which water is added to disperse the solids in the fluid mass. The entire slurry is then fed via conduit 21 to a magnetic separator 22 of sufficient capacity to separate by magnetic attraction the magnetite from the non-magnetic coal particles and most of the water. The water introduced into box 20 dilutes the mass and prevents the magnetic permeable particles from entrapping coal particles and thus inhibiting a good segregation in the magnetic separator 22.

The entire cone sink discharge, comprising refuse, magnetite, and water, is passed via conduit 25 to a different dilution box 25 and treated in similar fashion. Water is added and the diluted mass passes via conduit 27 to a magnetic separator 28 to separate the magnetite from the refuse and most of the water.

The coal product and refuse, now being separated from each other and from the magnetite of the heavy medium, pass out of the process with some water through conduits 30 and 31, respectively.

The magnetite discharged from the magnetic separators is now in the state of coalescence and is passed via conduits 33 and 34 to an agitator 35 in order to disperse the medium. In agitator 35, the heavy medium is subjected to violent agitation with a mixer 36 driven by a motor 37 to restore the magnetite to its original dispersed state. The magnetite particles tend to coalesce due to two factors. By passing through the magnetic separators, the particles have imposed upon them a slight magnetic polarization. Also, since the particles are quite small, there exists a pronounced cohesive attraction which causes them to tend to agglomerate or coalesce. The reclaimed medium passes from agitator tank 35 via conduit 38 to a sump or reservoir 39. An oulet conduit 40 connects the sump 39 with a pump 41 that recirculates the medium in conduit 12. Conduit 16 is a branch from conduit 12.

The final step of the process is to balance the reclaimed magnetite with the proper amount of water. When necessary, this is done by the additional of water to the storage sump 39 via conduit 45. The medium is recirculated to the separating vessel 10 by means of the medium recirculating pump 41 at any desired specific gravity, in its original dispersed state, free of contamination and in a state or condition suitable for reintroduction into the system.

Since the problems of separating fine solids differ from those encountered in handling coarse materials, this process is best adapted to the separation of fine solids of a size range ¼" x 0 and especially 10 mesh x 0.

When water accompanies the feed, it is not detrimental to the operation of this process, but must be taken into consideration. The effect of this water is to reduce the specific gravity of the heavy medium. This need not be harmful, however, since it can be compensated for by increasing the gravity of the medium.

The solid constituent of the medium must be magnetically permeable since the recovery of the medium from the separated products depends upon this property. Any magnetically susceptible material, such as magnetite, ferro silicon, or an iron alloy, is satisfactory. The choice of a magnetically susceptible material depends upon the desired gravity and viscosity of the medium, as well as its cost, permeability, and stability. The average size of the magnetically susceptible material used should be finer than the average size of the solids to be separated. A grind which would yield most of the magnetically permeable material below 325 mesh is satisfactory.

The rate of settling of fine particles in a medium decreases with increases in the specific gravity and the viscosity of the medium. If a specific gravity intermediate of the light and heavy fractions be used, as in present processes, the specific gravity and viscosity is so great that a separation is not possible. By using a gravity lower than the gravity of separation, the viscosity, as well as the specific gravity is reduced, thereby increasing the rate of settling and making separation a practical reality.

The separating vessel is designed and operated so as to speed-up the separating rate of the light and heavy particles. In the preferred separating vessel of the present invention, this is accomplished by a novel combination of the both Upward Current Principles and Sink and Float Principles. More specifically, the heavier particles are made to sink faster by decreasing the viscosity and the specific gravity of the medium bath, as stated above. The fluid bath is then caused to move upward against the falling particles to exert a force just sufficient that, when combined with the buoyant force of the medium, causes only the light particles to float. This upward moving fluid also carries the light particles from the separating vessel over a weir.

The fluid bath is a suspension of magnetically permeable particles in water and the suspension is not self-sustaining. The particles tend to settle. Heretofore, the medium has been maintained at a uniform specific gravity throughout by agitation. In the present invention, agitation of this type is detrimental to separation of the fine particles because of the introduction of eddy currents. According to the process herein described the larger medium solids settle slowly and only the finest of the medium solids are maintained in suspension by the upward movement of the bath. Thus, the specific gravity of the medium is not maintained uniformly throughout the bath, but increases with depth. This variation of the gravity of the bath is used to great advantage since the specific gravity in the upper portion of the bath can be quite low. Thus, settling in this portion is greatly facilitated.

It is necessary to remove the sink material as it collects to avoid crowding, which would increase the specific gravity and viscosity and inhibit the separation. It is also necessary to remove the sink material without disturbing the upward current of the medium. Therefore, the sink material is not removed with medium which has passed through the separating zone since such medium would necessarily have had to travel downward to the discharge opening, in opposition to the upward moving bath, with the production of eddy currents. As pointed out earlier, a fluid is supplied to the vessel well below the separating zone. This fluid carries the sink material through an orifice or pipe. Under these circumstances, the material is accompanied by liquid which has not passed through the separating zone, and, therefore, the separation is not disturbed. Removal of heavy product in this manner is accomplished at a relatively constant rate.

Although the fluid which hydraulically transports the sink particles from the separating vessel is shown as additional gravity medium, some other liquid, such as water, may be used because this liquid does not take part in the separation. If a fluid other than the gravity medium is used, special care must be exercised to prevent this liquid from intermixing with the main bath.

The magnetic separators used herein can be any of a number of commercial designs. They may be belt, drum, or revolving field type. They may be excited by D.C. or A.C. currents, or by permanent magnets. It is essential that the magnetic separators be operated so as to extract substantially all the magnetic particles from the float and sink products with a minimum of entrapment of non-magnetic material. It is also preferred that the magnetic concentrates have a specific gravity higher than that of the recirculated medium so that the desired gravity may be obtained merely by the addition of water. This is a departure from prior processes wherein the magnetic separators are operated to yield a magnetic concentrate with a specific gravity less than the recirculated medium. Accordingly, the concentrate then has to be thickened to obtain the desired gravity.

In the case of both light and heavy fractions, the number of magnetic separators used may vary. This invention does not limit each medium reclaiming treatment to one magnetic separator. Nor is it essential that each treatment contain the same number of magnetic separators. The separators may be used in parallel or in series. The process is not altered by the size, the number, or the arrangement of magnetic separators used in each case.

The magnetic separator concentrates may be treated separately if so desired. However, since they will eventually be joined together, it is much simpler to combine those magnetic concentrates before dispersion in the manner previously mentioned.

When coalescence of the particles results from magnetic attraction only, a demagnetizing coil may be substituted for the violent agitation recommended to be used in this process. As mentioned, the shearing action of violent agitation destroys coalescence, due to cohesion as well as magnetic attraction and is preferred. It is important, however, that the size distribution of the magnetic solids is not greatly altered, because this influences the density variation maintained in the separating vessel.

In order to obtain the desired specific gravity, it is usually necessary to restore the medium to the proper ratio of water to solids for reintroduction to the system. Since substantially all the magnetically permeable solids are reclaimed, with virtually no contamination and at a specific gravity higher than the recirculated medium, any deviation from the proper gravity is due to a loss of water.

Furthermore, since all apparatus used in the process, except the storage sump, contain a constant volume, any loss of water in the process would result in a loss of volume in the storage sump. Therefore, the desired specific gravity is restored and controlled merely by the addition of water so as to maintain a predetermined medium level in the storage sump.

The following example of the cleaning of an extremely fine size of anthracite coal will illustrate the operation of the process:

Raw coal of a size range 35 mesh x 0 having an ash content of 33.30% and the following percentage of sizes:

| U.S.: | Percent |
|---|---|
| +35 mesh | 0.50 |
| +60 mesh | 36.15 |
| +80 mesh | 26.10 |
| +100 mesh | 13.00 |
| +200 mesh | 17.50 |
| −200 mesh | 6.75 | is fed by means of a chute into the separating cone at the rate of 28 net tons per hour. Heavy medium of a specific gravity of 1.35 which has been circulating through the system for about ten minutes is now delivered to the same chute at the rate of 45 gallons per minute and the mixture of coal and medium is discharged into the medium bath slightly below the surface. The medium is made up of an aqueous magnetite suspension with 90% of the particles minus 325 mesh and the remainder plus 325 mesh and minus 200 mesh. Medium of the same specific gravity is introduced into the lower section of the cone at the rate of 150 gallons per minute imparting an upward movement of the bath. In a matter of minutes equilibrium is attained and the specific gravity at the top of the cone is about 1.15 and that at the bottom 1.50.

The light fraction (coal) and medium overflows a weir at the top of the cone and is delivered directly to a magnetic separator through a dilution box. No water is added in this instance because dilution is unnecessary. The dilution box serves merely as a feed hopper to the magnetic separator. The magnetic separator discharges water and a coal product free from particles of magnetite at the rate of 16.5 net tons per hour. The medium is discharged from the magnetic separator at a specific gravity of 2.1 and delivered directly to a dispersion box.

The sink fraction (refuse) and medium is discharged through a 1¼ inch orifice at the apex of the cone, and delivered to a dilution box to which water is added to reduce the specific gravity of the fluid mass to 1.25. The effluent from the dilution box is delivered directly to the refuse magnetic separator which discharges a medium of specific gravity of 2.3, and the water and refuse free from particles of magnetite.

The medium from this refuse magnetic separator is delivered to the dispersion box where it is joined with the medium from the coal magnetic separator and subjected to violent agitation. The overflow from the dispersion box is delivered directly to the sump tank where water is added by means of a float controlled valve. The level of the medium in the sump tank is maintained constant and the medium having a specific gravity of 1.35 is now returned to the separating cone.

The coal produced contains 11.97% ash and the following percentage of sizes:

| U.S.: | Percent |
|---|---|
| +35 mesh | 0.40 |
| +60 mesh | 37.26 |
| +80 mesh | 27.44 |
| +100 mesh | 13.59 |
| +200 mesh | 13.60 |
| −200 mesh | 7.71 |

The refuse contains 76.06% ash and the following percentage of sizes:

| U.S.: | Percent |
|---|---|
| +35 mesh | 0.71 |
| +60 mesh | 34.10 |
| +80 mesh | 22.42 |
| +100 mesh | 12.03 |
| +200 mesh | 26.04 |
| −200 mesh | 4.70 |

The theoretical yield of the product: 66.8% or 18.7 tons.

The actual yield: 16.5 tons or 88.4% of theoretical recovery.

From the foregoing, it will be apparent that the present invention possesses a number of important advantages. First and most important, it permits processing of a very fine feed which heretofore could not be efficiently separated by any method previously advanced which relied upon specific gravity differences.. Second, the process can be carried out quickly and easily with a very small amount of equipment, since drainage screens, washing screens, thickeners, magnetizing blocks, demagnetizing coils, and densifiers have been eliminated. Another great advantage is the use of the preferred separating vessel which yields an efficient separation, with a minimum amount of magnetically permeable material circulated and a minimum amount of power and wear.

The discussion of the present invention has been largely concerned with a separation of two products. This process is not necessarily so limited. For example, either the float or the sink fractions of the separating vessel may be further treated in another separating vessel operated at a different specific gravity to obtain an intermediate product or a third product. Pretreatment or retreatment does not constitute a departure from the scope of the present invention.

The above-described separating vessel is novel in design and operation and in itself represents an invention. It is not, however, the intent to limit the present process to its use. Other separating vessels, such as heavy medium cyclones and heavy medium centrifuges that increase the separating rate by substituting centrifugal force for gravity, may also be used. However, these vessels are not preferred because they require more magnetic material per ton of material processed, and, therefore, require more magnetic separator capacity. They also require more power and have the additional disadvantage of another variable, centrifugal force, which must be controlled.

Although the present invention has been shown and described with reference to a preferred embodiment, nevertheless, various changes and modifications such as are obvious to one skilled in the art and which do not depart from the spirit, scope and contemplation of the inventive thought herein embodied are deemed to fall within the boundaries of the invention.

What is claimed is:

1. A process for the gravity separation of a mixture of fine sized non-magnetic solids containing light and heavy particles into a light fraction and a heavy fraction ontaining said light and heavy particles, respectively, said light and heavy particles being in the size range extending from about ¼ inch down to and including minus 200 mesh, which process includes the steps of introducing said mixture of said solids into a relatively quiescent bath composed of an aqueous suspension of magnetically permeable particles, said bath being characterized by a gravity gradient and a viscosity gradient, both gradients decreasing from the bottom to the top of said bath in such a manner as to establish a separating zone of low specific gravity and low viscosity adjacent the top of said bath, whereby said heavy particles fall freely and rapidly through said separating zone, introducing a first quantity of aqueous suspension of magnetically permeable particles having a specific gravity less than that of said light particles adjacent the top of said bath to assist in conveying said light particles across said bath, introducing a second quantity of said aqueous suspension having the same specific gravity as that of said first quantity at a point below said separating zone in sufficient amount to carry said heavy particles downwardly from adjacent said point and to induce a movement of said bath upwardly from adjacent said point, said upward movement establishing and maintaining constant said gravity gradient of said bath while combining with the buoyant force of said bath to permit only the light particles to float, withdrawing said light fraction containing said light particles together with a portion of the aqueous suspension from the top of said bath, withdrawing said heavy fraction containing said heavy particles together with a portion of the aqueous suspension through a restricted opening at the bottom of said bath.

2. The process according to claim 1 wherein the total amount of each of said fractions containing its respective particles and a portion of the aqueous suspension is subjected directly to a magnetic separation thereby removing all of the said magnetically permeable particles in a coalescent state and recovering said light and heavy fractions free of said magnetically permeable particles.

3. The process according to claim 1 wherein the magnetically permeable particles removed from each fraction are combined and subjected to a violent agitation to destroy their coalescent state.

4. The process according to claim 3 wherein the thus decoalesced magnetically permeable particles together with a quantity of water are introduced into a reservoir from which said first and second quantities of aqueous suspension are taken, said water being added in sufficient amount to maintain a constant volume of aqueous suspension in the process, whereby the specific gravity of the aqueous suspension is maintained constant.

5. A process for the gravity separation of a mixture of fine sized non-magnetic solids containing light and heavy particles into a light fraction and a heavy fraction containing said light and heavy particles, respectively, said light and heavy particles being in the size range extending from about ¼ inch down to and including minus 200 mesh, which includes the steps of introducing said mixture of said solids into a relatively quiescent bath composed of an aqueous suspension of magnetically permeable particles having a particle size less than about 200 mesh, said bath being contained in a vessel having downwardly converging side walls and being characterized by a gravity gradient and a viscosity gradient, both gradients decreasing from the bottom to the top of said bath in such a manner as to establish a separation zone of low specific gravity and low viscosity adjacent the top of said bath, whereby said heavy particles fall freely and rapidly through said separating zone, introducing a first quantity of aqueous suspension of magnetically permeable particles having a specific gravity less than that of said light particles adjacent the top of said bath to assist in conveying said light particles across said bath, introducing a second quantity of said aqueous suspension having the same specific gravity as that of said first quantity at a point below said separating zone in sufficient amount to carry said heavy particles downwardly from adjacent said point and to induce a movement of said bath upwardly from adjacent said point, said upward movement establishing and maintaining constant said gravity gradient of said bath while combining with the buoyant force of said bath to permit only the light particles to float, withdrawing said light fraction containing said light particles together with a portion of the aqueous suspension from the top of said bath, withdrawing said heavy fraction containing said heavy particles together with a portion of the aqueous suspension through a restricted opening at the bottom of said bath.

References Cited in the file of this patent

UNITED STATES PATENTS

| | | |
|---|---|---|
| 2,191,805 | Pearson | Feb. 27, 1940 |
| 2,373,635 | Wuensch | Apr. 10, 1945 |
| 2,398,127 | Trostler | Apr. 9, 1946 |
| 2,429,436 | Walker | Oct. 21, 1947 |
| 2,692,049 | Davis | Oct. 19, 1954 |
| 2,726,764 | Fontein | Dec. 13, 1955 |
| 2,743,815 | Goodwin | May 1, 1956 |

UNITED STATES PATENT OFFICE

CERTIFICATE OF CORRECTION

Patent No. 2,949,190            August 16, 1960

Joseph Ross Pagnotti et al.

It is hereby certified that error appears in the printed specification of the above numbered patent requiring correction and that the said Letters Patent should read as corrected below.

Column 4, lines 1, and 13, for "anthraciate", each occurrence, read -- anthracite --; column 5, line 11, for "additional" read -- addition --; column 8, line 63, for "ontaining" read -- containing --; column 9, line 26, for the claim reference numeral "1" read -- 2 --.

Signed and sealed this 31st day of January 1961.

(SEAL)
Attest:

KARL H. AXLINE
Attesting Officer

ROBERT C. WATSON
Commissioner of Patents